United States Patent
Jiawook et al.

[11] Patent Number: 6,125,183
[45] Date of Patent: Sep. 26, 2000

[54] CRYPTOSYSTEM FOR OPTICAL STORAGE

[75] Inventors: Rizgar Nabi Jiawook; Babak Heidari, both of Lund; Lennart Olsson, Malmö, all of Sweden

[73] Assignee: Obducat AB, Sweden

[21] Appl. No.: 09/068,126

[22] PCT Filed: Oct. 30, 1996

[86] PCT No.: PCT/SE96/01391

§ 371 Date: Apr. 30, 1998

§ 102(e) Date: Apr. 30, 1998

[87] PCT Pub. No.: WO97/16896

PCT Pub. Date: May 9, 1997

[30] Foreign Application Priority Data

Oct. 30, 1995 [SE] Sweden .................................. 9503838

[51] Int. Cl.[7] .............. H04L 9/06; H03M 13/27
[52] U.S. Cl. .......................... 380/28; 380/37; 380/43; 380/265; 714/756; 714/784
[58] Field of Search .................. 380/28, 43, 265, 380/37, 268, 269; 714/784, 756

[56] References Cited

U.S. PATENT DOCUMENTS

| 4,200,770 | 4/1980 | Hellman et al. . |
| 4,417,338 | 11/1983 | Davida .................................... 380/286 |
| 4,639,548 | 1/1987 | Oshima et al. ............................ 380/30 |
| 5,054,066 | 10/1991 | Riek et al. ................................ 380/30 |
| 5,220,606 | 6/1993 | Greenberg . |

FOREIGN PATENT DOCUMENTS

WO95/03655  2/1995  WIPO .
WO96/00963  1/1996  WIPO .

*Primary Examiner*—Gilberto Barróon, Jr.
*Attorney, Agent, or Firm*—Mathews, Collins, Shepherd & Gould, P.A.

[57] ABSTRACT

A method of encrypting and decrypting digital data such as text, numeric, images, pictures, especially tailored for optical compact discs; said method comprising of ciphering/deciphering and error detection and correction using algebraic method, namely Reed-Solomon code.

10 Claims, 4 Drawing Sheets

| The selected Key | The selected Random matrices | $c_{1j} = \text{sum}(k_i\, r_{ij})$, $i=1\ldots n$ |
|---|---|---|

$$[k_1\ k_2\ k_3\ \cdots\ k_n] \begin{bmatrix} r_{11} & r_{12}\ r_{13}\ \cdots\ r_{1j}\ \cdots\ r_{1n} \\ r_{21} & \\ r_{31} & \\ \cdot & \\ r_{n1} & r_{nn} \end{bmatrix} = [c_{11}\ c_{12}\ c_{13}\ \cdots\ c_{1n}]$$

$$[k_{n+1}\ k_{n+2}\ k_{n+3}\ \cdots\ k_{2n}] \begin{bmatrix} r_{11} & r_{12}\ r_{13}\ \cdots\ r_{1j}\ \cdots\ r_{1n} \\ r_{21} & \\ r_{31} & \\ \cdot & \\ r_{n1} & r_{nn} \end{bmatrix} = [c_{21}\ c_{22}\ c_{23}\ \cdots\ c_{2n}]$$

$$\cdots$$

$$[k_{m-tn+1}\ k_{m-tn+2}\ k_{m-tn+3}\ \cdots\ k_m] \begin{bmatrix} r_{11} & r_{12}\ r_{13}\ \cdots\ r_{1j}\ \cdots\ r_{1n} \\ r_{21} & \\ r_{31} & \\ \cdot & \\ r_{n1} & r_{nn} \end{bmatrix} = [c_{m-tn+1,1}\ c_{m-tn+2,2}\ c_{m-tn+3,3}\ \cdots\ c_{m,n}]$$

m is a multiple of n

Fig. 2

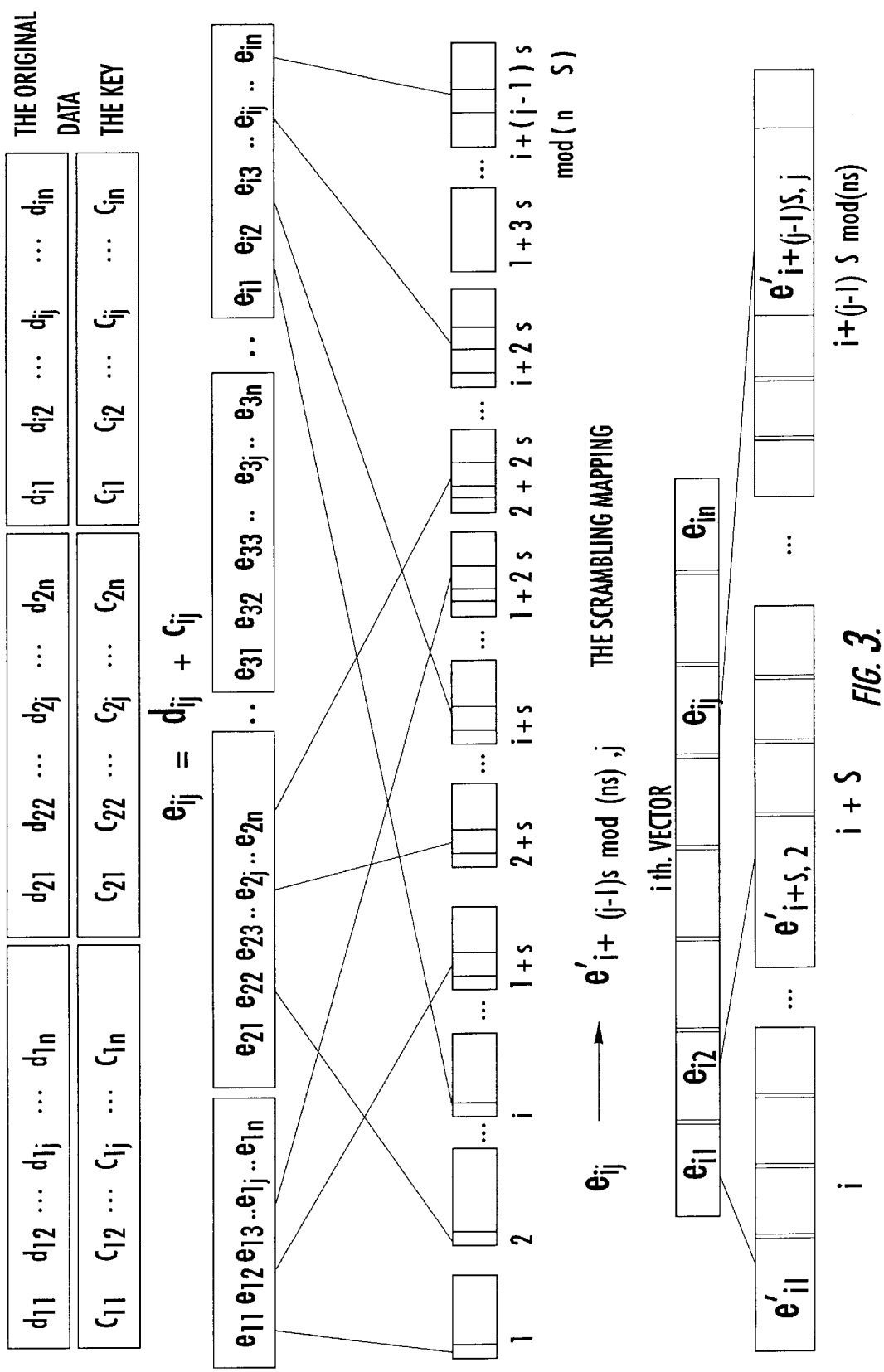

for: s=4, i=97, n=24, and the blocks 94 & 95

| $e'_{1,3}$ $b_{95}$ | $e'_{2,97}$ $b_{94}$ | $e'_{3,93}$ $b_{94}$ | | | | | | $e'_{22,17}$ $b_{94}$ | $e'_{22,13}$ $b_{94}$ | $e'_{24,9}$ $b_{94}$ |

Byte no. 2 from vector 97 in block 94

Fig. 4

CRYPTOSYSTEM FOR OPTICAL STORAGE

TECHNICAL FIELD

Encryption systems are widely used to ensure the privacy of information. They prevent the extraction of information by unauthorised parties.

Encryption systems have been in use in many different applications. Most famous is probably the war time use in military transmission. It all began with coded hand written messages transferred by a messenger and has developed to coded telecommunication signals carried by electrical means or through the air by radio waves. All such messages made unreadable to everyone without the knowledge of the cryptosystem to avoid that secret information falls into the hands of the enemy.

With the arrival of computers and digital signal communication there have risen a demand for encryption and privacy of the digital information. When digital information is stored there is a demand to that information may be interpreted only by some one with authorisation.

Most magnetic media have an expected lifetime of up to only a few years and for transmission there is virtually no lifetime of the transferred information itself. The data vanishes by itself.

The existing cryptosystems are specially designed for magnetic media and communications, and they do not take into account the optical media specifically, which is: encrypted data on a CD-ROM means that the data must remain safe as long as the CD-ROM is in use, i.e., for the life time of the CD-ROM which might extend to 100 years or more.

Several different type of cryptosystems have been developed in a variety of solutions. Most systems add redundant data, especially the algebraic codes. The encryption and decryption processes are in most systems time consuming due to the complex algorithms and calculations.

Symmetric or asymmetric coding algorithms can be employed for encryption. DES (data encryption standards) is an example for a symmetric algorithm. It employs identical key for coding and decoding.

Symmetric cryptosystems are particularly suitable when large data sets have to be stored or transmitted at a high rate.

In asymmetric cryptosystems such as RSA, different keys are employed for coding and decoding. These types of algorithms are time consuming and they depend on the key length employed.

By the introduction of CD ROM some ten years ago we have a storage and distribution medium, bringing a new perspective to handling of information. The CD ROM that began with the CD audio has during the last years taken a major part in the development of computer and information technology.

CD ROM technology is by the magnitude of the established system expected to last for many years. The area where it can be used is very wide. Due to its very low cost and ability to withstand rough handling, a CD ROM is very cost effective medium for both storing and physically transferring information. With the introduction of recordable CD compatible media and writers there will be a fast growing market and also a fast growing demand for efficient encrypting systems. Integrity of data stored or transferred will be more important.

By our invention we have made it possible to let information be stored on a CD with a not so far seen level of integrity.

The system is based on the standard algorithms used for error correction codes on a standard CD. The design and complexity of the error correction system makes it possible to use very small changes in the information, prior to writing on the disc, to make it work also as a very efficient encryption system.

The system permits such a large amount (close to unlimited) of individual keys to be defined, that it is possible to provide individual keys in large numbers at a low cost each.

BACKGROUND ART

There are two well known cryptosystems based on algebraic code, namely McEliece public-key cryptosystem and Rao-Nam Private-key cryptosystem. Both systems are basically developed to be used for communication networks. McEliece system is based on the existence of Guppa codes, and Rao-Nam system is based on block codes.

In the above two systems, the key can be changed at any time and whenever it is needed, but in the case of the optical storage, Write Once and ROM types, the key which is used for encryption can not be changed, and should remain safe as long as the CD is in use, i.e., during the life-time of the storage media.

The advantage of the proposed cryptosystem over the above two systems is that our system do not add redundant data, and on the other hand it is faster, because it does not calculate parity checks. Also the key length does not affect the speed of the system.

DISCLOSURE OF INVENTION

The proposed system is a symmetric private-key cryptosystem based on algebraic codes. The algebraic code which is suitable for optical storage is the Reed-Solomon code. Since the CD-encoding and decoding systems are using the CIRC (Cross Interleaving Reed-Solomon Code), we have made use of the power of the CD-encoding system to provide a powerful cryptosystem specially tailored for optical storage, (FIG. 1).

The suggested algorithm is fast, and the encryption/decryption speed does not depend on the key-length, also there is no redundancy in the encryption algorithm, i.e., no parameters added to the original data.

The key-length can be up to 2376 bytes or up to 19 KBits, and can be chosen as a string of characters, bits or a scanned image, i.e., what ever combination.

The key is designed mainly for encrypting data for optical storage.

The keys could be chosen by the designer arbitrarily, or generated by using a pseudo-random numbers generator algorithms. In the later case the user may require only short seeds. For the random matrices, it could be generated automatically, or with the designer's interference.

BRIEF DESCRIPTION OF DRAWINGS

FIG. 2: Is a schematic diagram shows the key arrangement.

FIG. 3: Is a schematic diagram shows the sequence of encryption and the scrambling.

FIG. 4: Is a schematic diagram shows an example of how the encrypted block looks like.

DESCRIPTION OF THE SYSTEM

Figure 1:
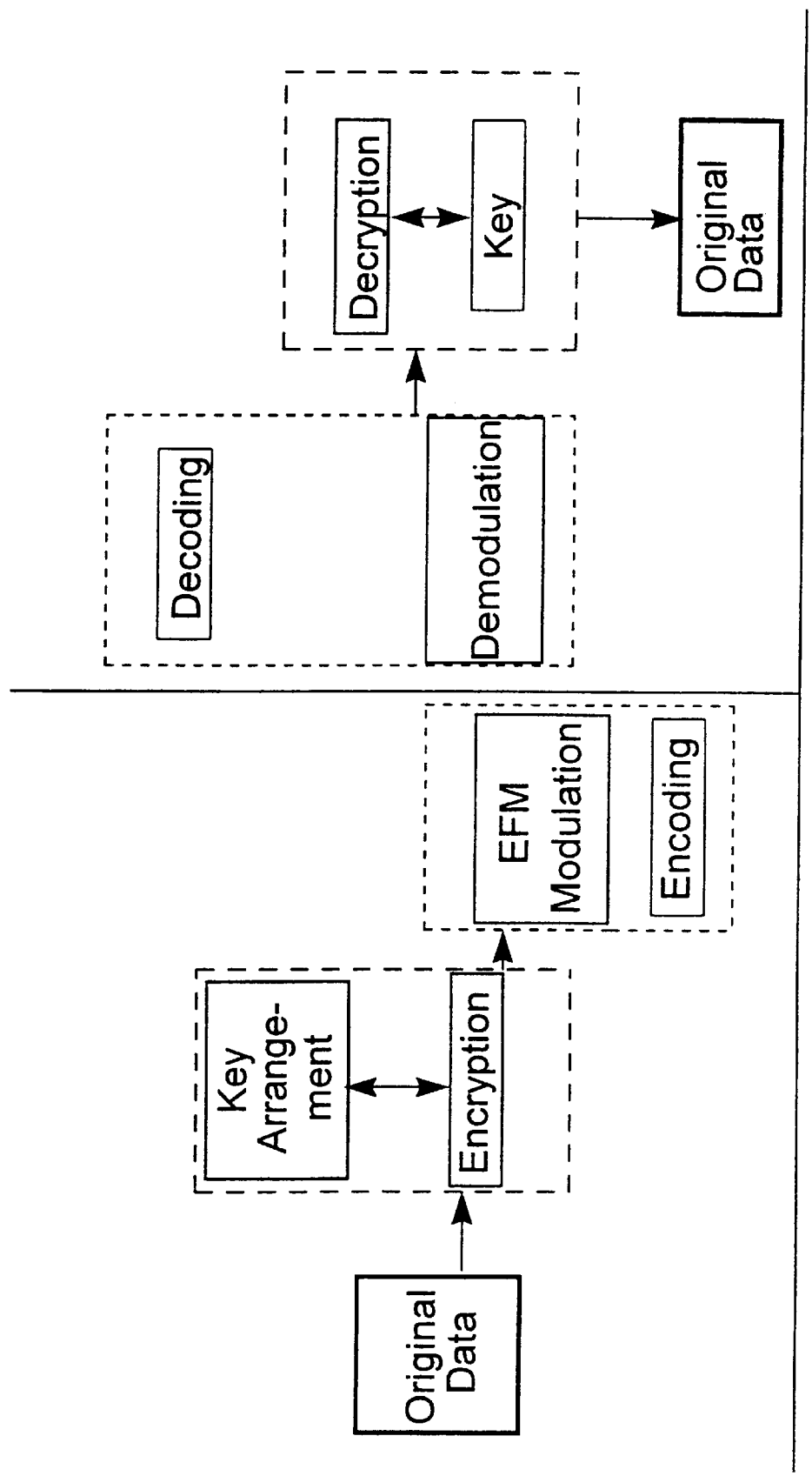
FIG. 1: Is a schematic diagram for the encryption and decryption for optical storage.

It is known that the original data to be stored on a CD are structured as frames (vector), each vector consists of 24

Bytes (called symbols). Now, to construct the encryption vector, the designer will:

Selects randomly a polynomial p(x) over GF($2^8$),

Select the desired key vector K randomly,

Choose a random matrix R using pseudo random numbers generator.

An internal manipulation will be carried out to arrange a proper key to be applied to the original data for encryption (FIG. 2). This is calculated only once.

The encryption vector will be as follows:

$$C = K \boxtimes R \qquad (\boxtimes \text{ is multiplication over Galois field})$$

R is an n×n random matrix

K 1×n the chosen key vector

C 1×n encryption vector

All the values of the matrices R, K and C are over GF($2^8$), and kept secret to provide higher security level.

The data to be encrypted are structured as vectors of n bytes each, if D is such a vector, then it will be encrypted as follows:

$$E = D + C \qquad (+ \text{ is addition over Galois Field})$$

D is the original vector (1×n)

C is the encryption vector (1×n)

E is the encrypted vector (1×n)

After this step the designer chooses a scrambler of depth s, (s=1,2,3,4,5, . . . ) and applies it to E, so the result will be an encrypted vector E', (FIG. 3).

The mapping looks something like:

$$e_{i,j} \text{-----------------} e'_{i+(j-1)s,j}$$

for i=1, . . . ,n; j=1, . . . , ns; s=any chosen positive integer.

FIG. 4 shows an example of an encrypted vector, for s=4, i=97, n=24, which contains data coming from blocks 94 & 95.

The decryption process is as follows:

First, the vector E' must be de-scrambled using the same depth s to get the encrypted vector E, and then compute:

$$D = E + C \qquad (+ \text{ is addition over Galois Field})$$

this will give the original vector, since,

E is the encrypted vector (1×n)

C is the decryption key (1×n)

D is the original vector (1×n)

As an example, for a key of length 24 Bytes (characters) chosen from the 256 EBCDIC character set table, the number of trials needed to verify the key=$2 \times 10^{57}$ suppose we have a computer system with 10 ns access time for one byte, which is equal to approx. $10^{-15}$ years. So, the number of years needed to verify the key=$10^{42}$ and on average $10^{21}$ years are needed.

The cryptosystem can be implemented, for example, as follows:

1. The cryptosystem can be implemented prior to the CD-Encoding.

2. The cryptosystem can be implemented within the CD-Encoding, after the scrambling during the mastering process.

3. The cryptosystem can be implemented within the CD-Encoding, after the C2 encoder during the mastering process.

4. The above two points (2,3) implies that a new CD-Reader must be developed to resolve the decryption and the decoding. This kind of implementation can be used for high security purposes, e.g., military applications and industrial high technology.

The cryptosystem can be realised by software and/or hardware solutions.

Using the fact that a fast algorithm exists for Reed-Solomon code, we developed a private-key cryptosystem which is very secure. This cryptosystem is ideal for use in optical media applications. It inter-relates with the Compact Disc encoding system standards for error detection and correction algorithm, and increases the power of the error correction used in the standards as a by-product.

The introduced system is a new approach for using algebraic code, that is a symmetric private-key cryptosystem. The algorithm used is fast, and the key-length does not affect the speed of the encryption and decryption processes of the data.

The suggested cryptosystem can be run on almost every PC, and of course, mainframes and mini computers.

The system is very efficient because of the low overhead for encryption and decryption. Also, the system does not add redundant data, and it is in harmony with the encoding standards for CDs, and gives extra power for the error correction that is used in the CD-standards.

The example given above shows that the system seems to be very secure even for small key length (24 bytes).

What is claimed is:

1. A method of encrypting and decrypting digital data such as text, numeric, images, pictures, especially tailored for optical compact discs; said method comprises of ciphering/deciphering and error detection and correction using algebraic method, namely Reed-Solomon code; said method characterised by the following steps:

A. choose a primitive polynomial p(x) over Galois Field (GF) according to CD-standards;

B. consider the data structure which are the values of different polynomials in said GF $$D = (d_1, d_2, d_3, \ldots d_n)$$

n is multiple of m;

C. select a key $$K = (k_1, k_2, k_3, \ldots, k_m);$$

D. generate a matrix of random variable $$R = (r_{ij})$$

i=1,2,3, . . . ,m; j=1,2,3 . . . ,m;

E. calculate the encryption vector $$C = K \boxtimes R$$

$\boxtimes$ is multiplication over said GF=$c_i$ i=1,2,3, . . . ,m;

F. enciphering the data $$E = D + C$$

+ is addition over said GF=$e_{ij}$ i=1,2,3, . . . , m; j=1,2,3, . . . ,n

G. apply scrambling of depth s $$E \rightarrow E'$$

$$e_{ij} \rightarrow e'_{i+(j-1)s,j}$$

i=1,2,3, . . . n; j=1,2,3, . . . ns; s any positive integer;

H. encode E' according to CD-encoding standards;

I. the output from H above is the enciphered data which are the values of the polynomials over said GF to be sent to the EFM modulation;

J. the decryption method comprises the following steps:
   decode the data according to the CD-standards to produce the ciphered data E';
   descramble the ciphered data: E'→E;
   calculate the decryption vector:

$$C = K \boxtimes R$$

¤ is multiplication over said GF;
add deciphering key to recover the original data:

$$D = E + C$$

+ is addition over said GF.

2. A method of encrypting and decrypting digital data according to claim 1, concerning said key length, said key length will be divided in segments according to the data block size:
   generate data blocks of size m;
   generate data vectors of length n;
   generate key segments from said key such that the number of said key segments are a divisor of said data block size m.

3. A method of encrypting and decrypting digital data according to claim 1, concerning said key type:
   provide said key as characters of 8-bit bytes of said key length.

4. A method of encrypting and decrypting digital data according to claim 1, concerning said key type:
   provide said key as binary bits of said key length.

5. A method of encrypting and decrypting digital data according to claim 1, concerning said key type:
   provide said key as characters and binary bits of said key length.

6. A method of encrypting and decrypting digital data according to claim 1, concerning said key type:
   provide said key as binary representation of images of said key length.

7. A method of encrypting and decrypting digital data according to claim 1, concerning the field of said random numbers,
   provide a primitive polynomial p(x) over Galois Field (GF);
   generate said random numbers over said GF.

8. A method of encrypting and decrypting digital data according to claim 1, concerning said key,
   generate said key over said GF.

9. A method of encrypting data on optical discs according to claims 3,4,5 or 6, concerning said key,
   multiply said key by said random numbers according to the rule:

$$C = K \boxtimes R$$

over GF encrypt the said data vector according to the rule:

$$E = D + C$$

over GF scramble the said enciphered data vector E with respect to the depth s, s is any chosen positive integer;

the output is a vector E' which is the enciphered and scrambled vector.

10. A method of encrypting and decrypting digital data according to claim 1, concerning the decryption,
   decode the data according to the CD-standards to produce the ciphered vector E',
   descramble the said data vector E' with the said depth s to provide data vector E,
   develop the deciphering key:

$$C = K \boxtimes R$$

over GF decipher the said the data vector E according to the rule:

$$D = E + C$$

over GF

D is the recovered data vector.

* * * * *